(12) United States Patent
Shinohara

(10) Patent No.: US 11,659,118 B2
(45) Date of Patent: May 23, 2023

(54) IMAGE FORMING APPARATUS INCLUDING A SHAKE SENSOR

(71) Applicant: TOSHIBA TEC KABUSHIKI KAISHA, Tokyo (JP)

(72) Inventor: Masatoshi Shinohara, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/666,031

(22) Filed: Feb. 7, 2022

(65) Prior Publication Data

US 2022/0407975 A1     Dec. 22, 2022

(30) Foreign Application Priority Data

Jun. 18, 2021  (JP) .............................. JP2021-101530

(51) Int. Cl.
*G06F 3/12* (2006.01)
*G06F 15/00* (2006.01)
*G06K 1/00* (2006.01)
*H04N 1/00* (2006.01)

(52) U.S. Cl.
CPC .............................. *H04N 1/00814* (2013.01)

(58) Field of Classification Search
CPC ....... H04N 1/00814; H04N 2201/3278; H04N 2201/0094; H04N 1/00238
See application file for complete search history.

(56) References Cited

U.S. PATENT DOCUMENTS

| | | | |
|---|---|---|---|
| 6,970,277 B1* | 11/2005 | Makishima | G01P 1/127 396/53 |
| 2003/0033451 A1* | 2/2003 | Yoshida | H04L 51/214 709/223 |
| 2013/0066987 A1* | 3/2013 | Levinson | G06Q 10/10 709/206 |
| 2013/0080919 A1* | 3/2013 | Kiang | H04L 67/63 715/753 |
| 2015/0039673 A1 | 2/2015 | Shibukawa | |

FOREIGN PATENT DOCUMENTS

| | | |
|---|---|---|
| JP | 2007-188441 A | 7/2007 |
| JP | 2012-212321 A | 11/2012 |

\* cited by examiner

*Primary Examiner* — Moustapha Diaby
(74) *Attorney, Agent, or Firm* — Kim & Stewart LLP

(57) ABSTRACT

According to an embodiment, an image forming apparatus transmits, where a shake sensor has detected a shake of a predetermined magnitude or more, response request information to a destination indicated by destination information stored in a storage device. The image forming apparatus stores, where a response has been received from the destination, information regarding the received response in the storage device.

7 Claims, 7 Drawing Sheets

| User identification information | First destination information | Second destination information |
|---|---|---|
| x1011 | mail1 | fax1 |
| x1012 | mail2 | fax2 |
| x1013 | mail3 | fax3 |
| ⋮ | ⋮ | ⋮ |

Fig.3

IMAGE FORMING APPARATUS INCLUDING A SHAKE SENSOR

CROSS-REFERENCE TO RELATED APPLICATIONS

This application is based upon and claims the benefit of priority from the prior Japanese Patent Application No. 2021-101530, filed on Jun. 18, 2021, the entire contents of which are incorporated herein by reference.

FIELD

An embodiment to be described here generally relates to an image forming apparatus.

BACKGROUND

In the past, an image forming apparatus having a function of detecting the occurrence of an earthquake has been proposed. For example, it has been proposed that in the case where the occurrence of an earthquake has been detected, the image forming apparatus transmits, to a predetermined destination, information indicating whereabouts of a subordinate who belongs to the office where the image forming apparatus is installed. However, when a trouble has occurred in the image forming apparatus or in another device, expected processing cannot be always completed in some cases.

BRIEF DESCRIPTION OF THE DRAWINGS

FIG. 3 is a diagram showing a specific example of destination information stored in a storage device according to the embodiment;

DETAILED DESCRIPTION

According to an embodiment, an image forming apparatus includes: a communication device; a storage device; a shake sensor; and a controller. The communication device communicates with a terminal apparatus used by each of a plurality of users via a network. The storage device stores, for each of pieces of user identification information for identifying the plurality of users, destination information indicating a destination used for transmitting information to the terminal apparatus. The shake sensor detects a shake. The controller transmits, where the shake sensor has detected a shake of a predetermined magnitude or more, response request information that is information for requesting a response to a destination indicated by the destination information stored in the storage device via the communication device. The controller receives, where a response has been transmitted from the destination, the transmitted response. Further, the controller records, in the storage device, information regarding the received response.

Figure 1:
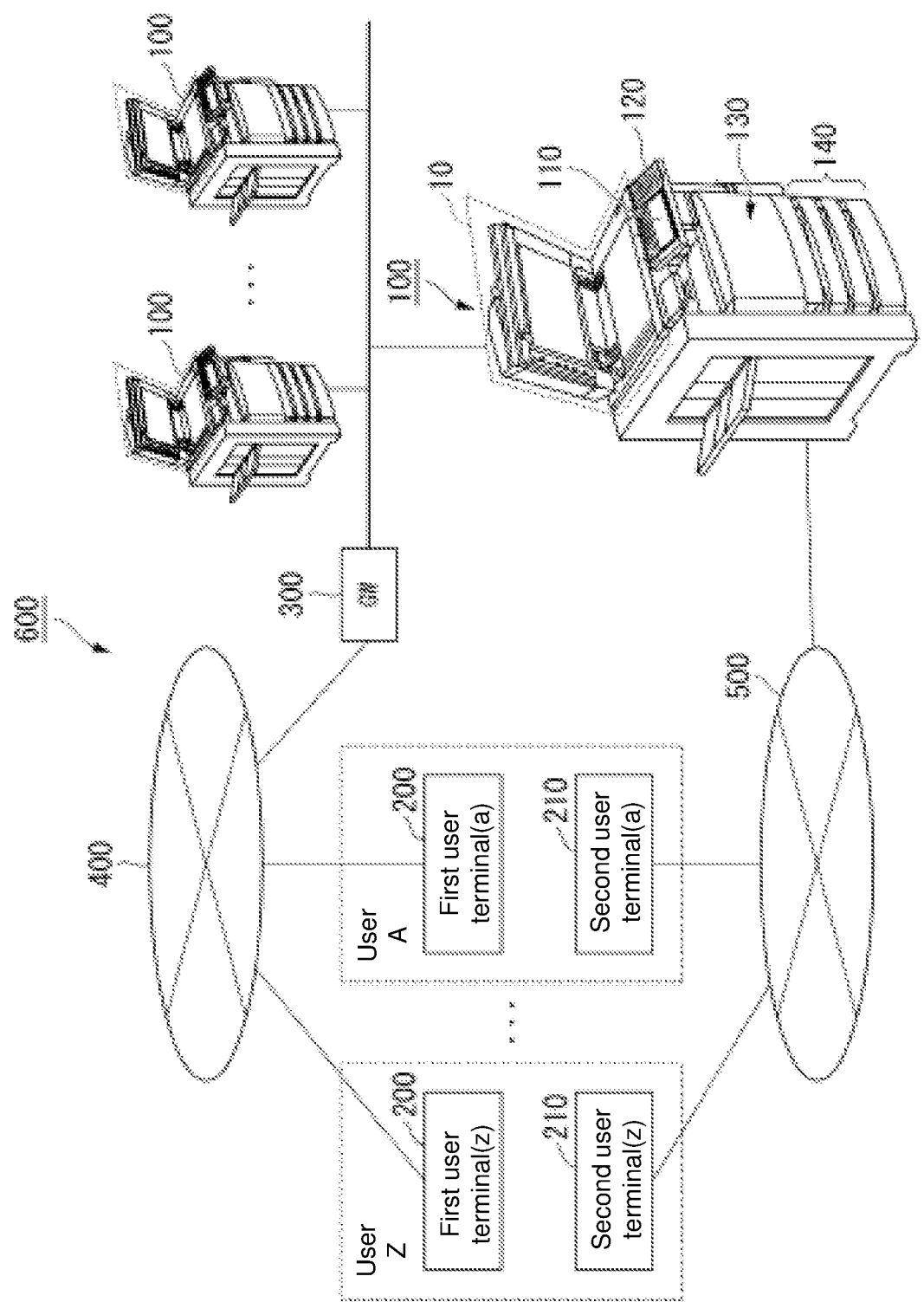
FIG. 1 is a diagram showing a configuration example of a safety confirmation system according to an embodiment.

An image forming apparatus according to an embodiment will be described below with reference to the drawings. In the drawings, the same reference symbols indicate the same or similar parts. FIG. 1 is a diagram showing a configuration example of the safety confirmation system 600 according to the embodiment. The safety confirmation system 600 includes one or more image forming apparatuses 100 and a plurality of user terminals (e.g., a plurality of first user terminals 200 and a plurality of second user terminals 210). The image forming apparatus 100 stores, for each user, a plurality of pieces of destination information indicating respective destinations for making a notification to a plurality of users (e.g., a user "A" to a user "Z"). In this embodiment, the image forming apparatus 100 stores first destination information and second destination information for one user.

In the specific example shown in FIG. 1, the first destination information is destination information indicating a destination for making a notification to a user via the first user terminal 200. The second destination information is destination information indicating a destination for making a notification to a user via the second user terminal 210. In this case, a certain first user terminal 200 and a certain second user terminal 210 are used by the same user. For example, in FIG. 1, a first user terminal (a) and a second user terminal (a) are used by the user "A". For example, in FIG. 1, a first user terminal (z) and a second user terminal (z) are used by the user "Z".

The image forming apparatus 100 is an apparatus that forms an image on a sheet. The image forming apparatus 100 is communicably connected to the first user terminal 200 and the second user terminal 210. The mode in which the image forming apparatus 100 communicates with the first user terminal 200 and the mode in which the image forming apparatus 100 communicates with the second user terminal 210 may be realized in any way.

In the example shown in FIG. 1, the image forming apparatus 100 is communicably connected to a first network 400 and a second network 500. The image forming apparatus 100 is communicably connected to the first network 400 via a network such as a LAN (Local Area Network) and a GW (Gateway) 300. For example, as the first network 400, the Internet or a mobile communication network may be used. For example, as the first user terminal 200, an information device such as a smartphone, a personal computer, and a wearable device may be used.

The image forming apparatus 100 is communicably connected to the second network 500 via a modem, for example. The image forming apparatus 100 is communicably connected to the first user terminal 200 via the first network 400. The image forming apparatus 100 is communicably connected to the second user terminal 210 via the second network 500. For example, as the second network 500, a telephone line such as a public switched telephone network may be used. For example, as the second user terminal 210, a communication device such as a facsimile (FAX) may be used. The respective devices will be described below in detail.

Figure 2:
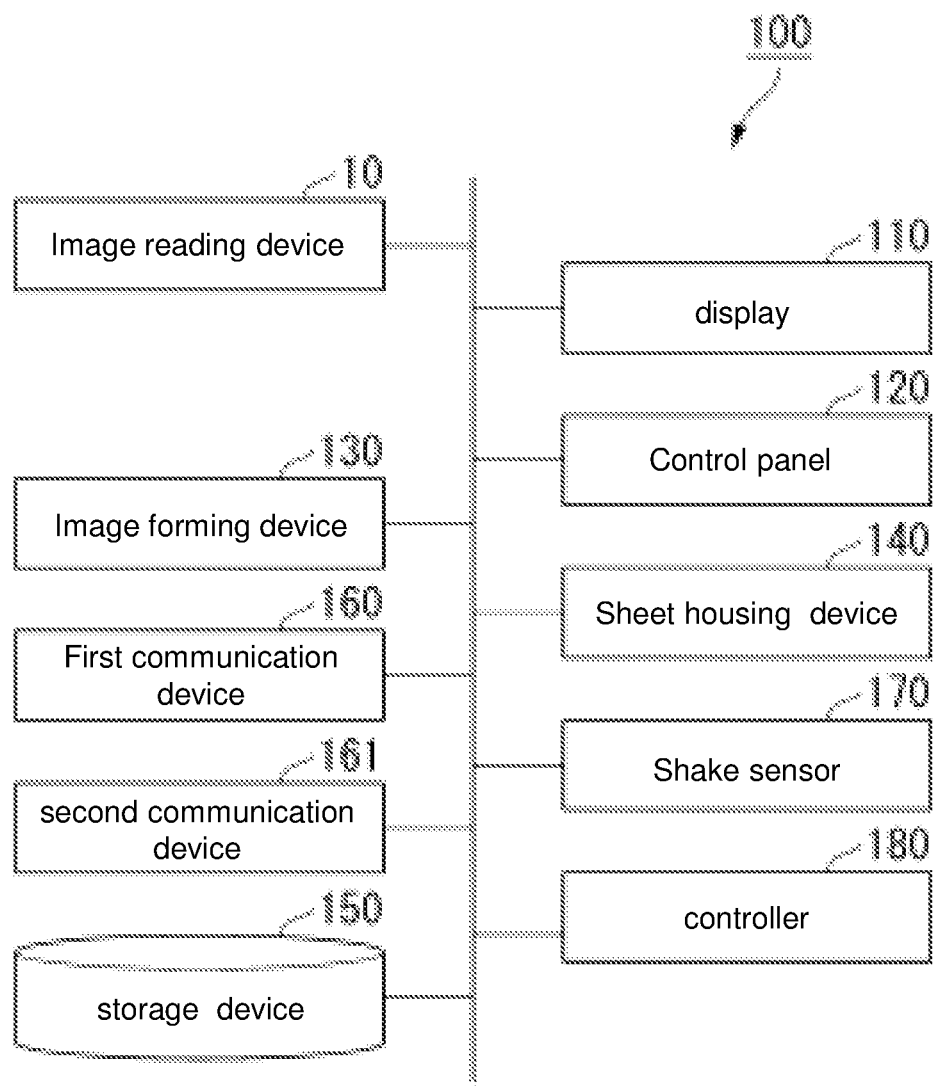
FIG. 2 is a hardware block diagram of an image forming apparatus according to the embodiment.

FIG. 2 is a block diagram showing a hardware configuration of the image forming apparatus 100 according to the embodiment. First, the image forming apparatus 100 will be described in detail with reference to FIG. 1 and FIG. 2. The image forming apparatus 100 includes an image reading device 10, a display 110, a control panel 120, an image forming device 130, a sheet housing device 140, a storage device 150, a first communication device 160, a second communication device 161, a shake sensor 170, and a controller 180.

The image forming apparatus 100 forms an image on a sheet by using a coloring material such as a developer (toner) and ink. In the case where the coloring material is a toner, the coloring material is heated to be fixed on a sheet, and thus, an image is formed on the sheet. In the case where the coloring material is ink, the coloring material is dropped onto the sheet, and thus, an image is formed on the sheet. The sheet is, for example, paper or label paper. The sheet may be any material as long as an image can be formed on the surface of the sheet by the image forming apparatus 100.

The image reading device 10 reads image information to be read as light and dark. The image reading device 10 reads image information to be read to generate and store image data. The stored image data may be transmitted to another information processing apparatus via a network. The stored image data may be output to the image forming device 130. As will be described below, the image forming device 130 forms an image on a sheet on the basis of the output image data.

The display 110 is an image display device such as a liquid crystal display and an organic EL (Electro Luminescence) display. The display 110 displays various types of information regarding the image forming apparatus 100.

The image forming device 130 forms an image on a sheet on the basis of the image data generated by the image reading device 10 or image data received via a communication path. The image forming device 130 includes, for example, a photoconductor drum, an exposure device, a developing device, a transfer device, and a fixing device. A sheet-conveying path is formed in the image forming device 130. A sheet to be processed is conveyed by a roller provided in the conveying path. An image is formed on the sheet in the process of conveying.

The image forming device 130 forms an image by, for example, the following processing. The exposure device of the image forming device 130 forms an electrostatic latent image on the photoconductor drum on the basis of image information data. The developing device of the image forming device 130 forms a visible image (toner image) on the photoconductor drum by adhering a coloring material (toner) to the electrostatic latent image.

The transfer device of the image forming device 130 transfers the visible image from the photoconductor drum onto the sheet. The fixing device of the image forming device 130 fixes the visible image onto the sheet by heating and pressurizing the sheet. Note that the sheet on which an image is formed may be a sheet that is housed in the sheet housing device 140 and conveyed or may be a manually fed sheet.

The sheet housing device 140 houses a sheet to be used for forming an image in the image forming device 130 and conveys the sheet to the image forming device 130 by a conveying roller.

As the storage device 150, a magnetic hard disk device, a semiconductor storage device, or the like is used. The storage device 150 stores data that is necessary for the image forming apparatus 100 to operate. The storage device 150 stores a plurality of pieces of destination information (the first destination information and the second destination information) set in advance for each user. Note that the number of the plurality of pieces of destination information set for one user does not necessarily need to be two, and three or more pieces of destination information may be set for one user.

FIG. 3 is a diagram showing a specific example of destination information stored in the storage device 150. The storage device 150 may store, for example, a destination information table shown in FIG. 3. The destination information table includes a plurality of destination information records. The destination information record has values of user identification information, first destination information, and second destination information. The user identification information is identification information assigned to each user so as not to be duplicated. The first destination information is destination information indicating a destination used when the user indicated by the user identification information is notified of information. The first destination information may be, for example, an e-mail address, a destination (e.g., a telephone number) of SMS (Short Message Service), or other information as long as characters and images can be transmitted. The second destination information is destination information indicating a destination used when the user indicated by the user identification information is notified of information.

However, the first destination information and the second destination information are different from each other. For example, the first destination information and the second destination information have different networks used for communication with the destination. For example, the first destination information and the second destination information have different protocols used for communication with the destination. For example, the first destination information and the second destination information have different applications used for communication with the destination. For example, the first destination information and the second destination information have different servers used for communication with the destination at the time of relay.

The description will be continued with reference to FIG. 2 again. As the first communication device 160, a communication interface is used. The first communication device 160 communicates with another terminal apparatus (e.g., the first user terminal 200) via the first network 400.

As the second communication device 161, a communication interface is used. The second communication device 161 communicates with another terminal apparatus (e.g., the second user terminal 210) via the second network 500.

The shake sensor 170 detects a shake the ground. The shake sensor 170 may be installed on a floor surface on which the image forming apparatus 100 is installed and detect a shake of the floor surface as a shake of the ground. The shake sensor 170 may be installed in the image forming apparatus 100 and detect a shake of the image forming apparatus 100 as a shake of the ground. The shake sensor 170 may detect a shake of the ground in any way. The shake sensor 170 outputs information regarding the detected shake to the controller 180. The information regarding a shake may be, for example, information indicating a physical quantity generated in the shake sensor 170 or information indicating a numerical value indicating the magnitude of the shake.

As the controller 180, a processor such as a Central Processing Unit (CPU) and a memory are used. The controller 180 reads and executes the program stored in advance in the storage device 150. The controller 180 controls the operation of the respective devices included in the image forming apparatus 100.

Further, the controller 180 transmits, in the case where the shake sensor 170 has detected a shake of a predetermined magnitude or more, safety confirmation information to a user registered in advance. At this time, the controller 180 transmits safety confirmation information using the first destination information first. The controller 180 receives a safety confirmation response (safety response) from each user after transmitting the safety confirmation information, and records the reception history in the storage device 150. The controller 180 transmits safety confirmation information using the second destination information to a user from whom a safety confirmation response has not been received even when a predetermined condition described below is satisfied.

Figure 4:
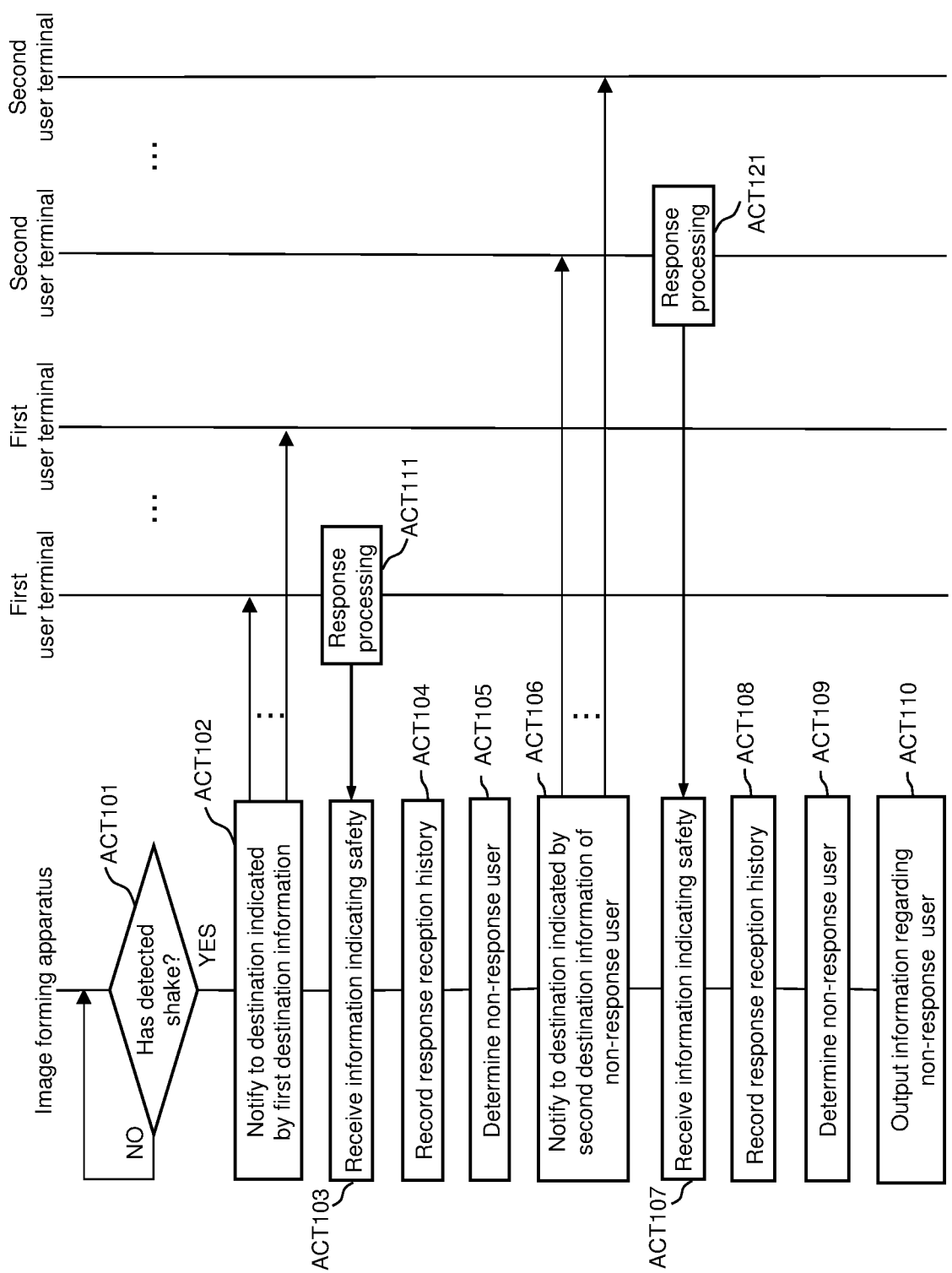
FIG. 4 is a flowchart showing a first specific example of the flow of safety confirmation processing executed by a safety confirmation system according to the embodiment.

FIG. 4 is a diagram showing a first specific example of safety confirmation processing executed by the safety confirmation system 600. First, in ACT101, the controller 180 determines whether or not the shake sensor 170 has detected a shake of a predetermined magnitude or more. The controller 180 does not execute substantial processing of safety confirmation processing until the shake sensor 170 detects a shake of a predetermined magnitude or more (ACT101—NO). In the case where the shake sensor 170 has detected a shake of a predetermined magnitude or more (ACT101—YES), the processing of the controller 180 proceeds to ACT102. In ACT102, the controller 180 transmits safety confirmation information to the destination indicated by each piece of first destination information registered in the storage device 150. The safety confirmation information transmitted using the first destination information is transmitted to the first user terminal 200 of each user.

The safety confirmation information is information for requesting a user to reply with information indicating the safety of the user (hereinafter, referred to as the "safety response"). The safety confirmation information may be, for example, information for displaying a button for transmitting the information indicating the safety of the user to the image forming apparatus 100. The safety confirmation information may include, for example, a link for transmitting the information indicating the safety of the user to the image forming apparatus 100.

The first user terminal 200 requests, upon receiving the safety confirmation information, the user for a safety response. The first user terminal 200 may display a character string or an image indicating to request a safety response on, for example, an image display device of the apparatus itself. The first user terminal 200 may output a voice indicating to request a safety response in, for example, an acoustic output device of the apparatus itself.

The user of the first user terminal 200 instructs, in response to the request for a safety response, the first user terminal to make a safety response. The instruction to make a safety response may be performed by, for example, an operation of an input device such as a touch panel display, a pointing device, and a keyboard. The instruction to make a safety response may be performed by, for example, uttering a voice of a character indicating the instruction by the user. In this case, the first user terminal 200 may acquire the instruction to make a safety response by performing voice recognition processing on the user's voice input via a microphone. In ACT111, the first user terminal 200 performs safety response processing in accordance with the user's instruction. Specifically, the first user terminal 200 transmits the information indicating the safety of the user to the image forming apparatus 100. In ACT103, the controller 180 receives information indicating safety via the first communication device 160. The information indicating safety may include, for example, user identification information of the user and the information regarding safety selected by the user (e.g., "no problem", "injured but can move", or "injured and cannot move").

In ACT103, the controller 180 of the image forming apparatus 100 receives the information indicating safety (the information regarding safety described above) from the first user terminal 200 via the first communication device 160. In ACT104, the controller 180 records the received information indicating safety in the storage device 150. In ACT105, the controller 180 determines a non-response user when a predetermined condition described below is satisfied after the notification using the first destination information.

The predetermined condition is a condition indicating that a sufficient time has elapsed for the user to operate the first user terminal 200 to make a safety response. The predetermined condition may be, for example, that a predetermined time has elapsed from the notification to the destination indicated by the first destination information. The predetermined condition may be, for example, that a predetermined operation has been performed by the administrator of the image forming apparatus 100.

The non-response user is a user from whom information indicating safety has not been received in the image forming apparatus 100. There is a possibility that such a non-response user has been unable to acquire a request to make a safety response transmitted from the image forming apparatus 100 to the destination indicated by the first destination information. In other words, there is a possibility that the first user terminal 200 of such a non-response user has not been capable of receiving information from the image forming apparatus 100 due to a failure of the communication infrastructure with the image forming apparatus 100.

In this regard, in ACT106, the controller 180 of the image forming apparatus 100 transmits, to the non-response user, safety confirmation information using destination information(the second destination information) different from the first destination information. The safety confirmation information transmitted to the destination indicated by the second destination information is transmitted to the second user terminal 210 of each user.

The second user terminal 210 requests, upon receiving the safety confirmation information, the user to make a safety response. As the second user terminal 210, for example, a facsimile may be used. In this case, the second destination information is a fax number. The second user terminal 210 may request the user to make a safety response by outputting (e.g., printing or display on a display) the image information of the FAX received from the image forming apparatus 100. The second user terminal 210 may display a character string or an image indicating to request to make a safety response on the image display device of the apparatus itself. The second user terminal 210 may output a voice indicating to request to make a safety response in, for example, the acoustic output device of the apparatus itself.

The user of the second user terminal 210 instructs, in response to the request to make a safety response, the second user terminal to make a safety response. The instruction to make a safety response may be, for example, an instruction to transmit a sheet on which an image indicating the information regarding safety is formed to the image forming apparatus 100 by FAX. The instruction to make a safety response may be, for example, an instruction to simply put an incoming call to the FAX number of the image forming apparatus 100. In this case, the incoming call may be treated as safety information indicating that the user is in the state of being at least movable. The instruction to make a safety response may be performed by the method described in the above-mentioned first user terminal 200. In ACT121, the second user terminal 210 performs safety response processing in accordance with the user's instruction. Specifically, the information indicating the safety of the user is transmitted to the image forming apparatus 100.

In ACT107, the controller 180 of the image forming apparatus 100 receives the information regarding safety from the second user terminal 210 via the second communication device 161. In ACT108, the controller 180 records the received information regarding safety in the storage device 150. In ACT109, the controller 180 determines a non-response user when a predetermined condition is satisfied after the notification to the destination indicated by the second destination information. The determined non-response user represents the user from whom information regarding safety has not been received in both of the notification to the destination indicated by the first destination information and the notification to the destination indicated by the second destination information. In ACT110, the controller 180 outputs information regarding the non-response user.

Figure 5:
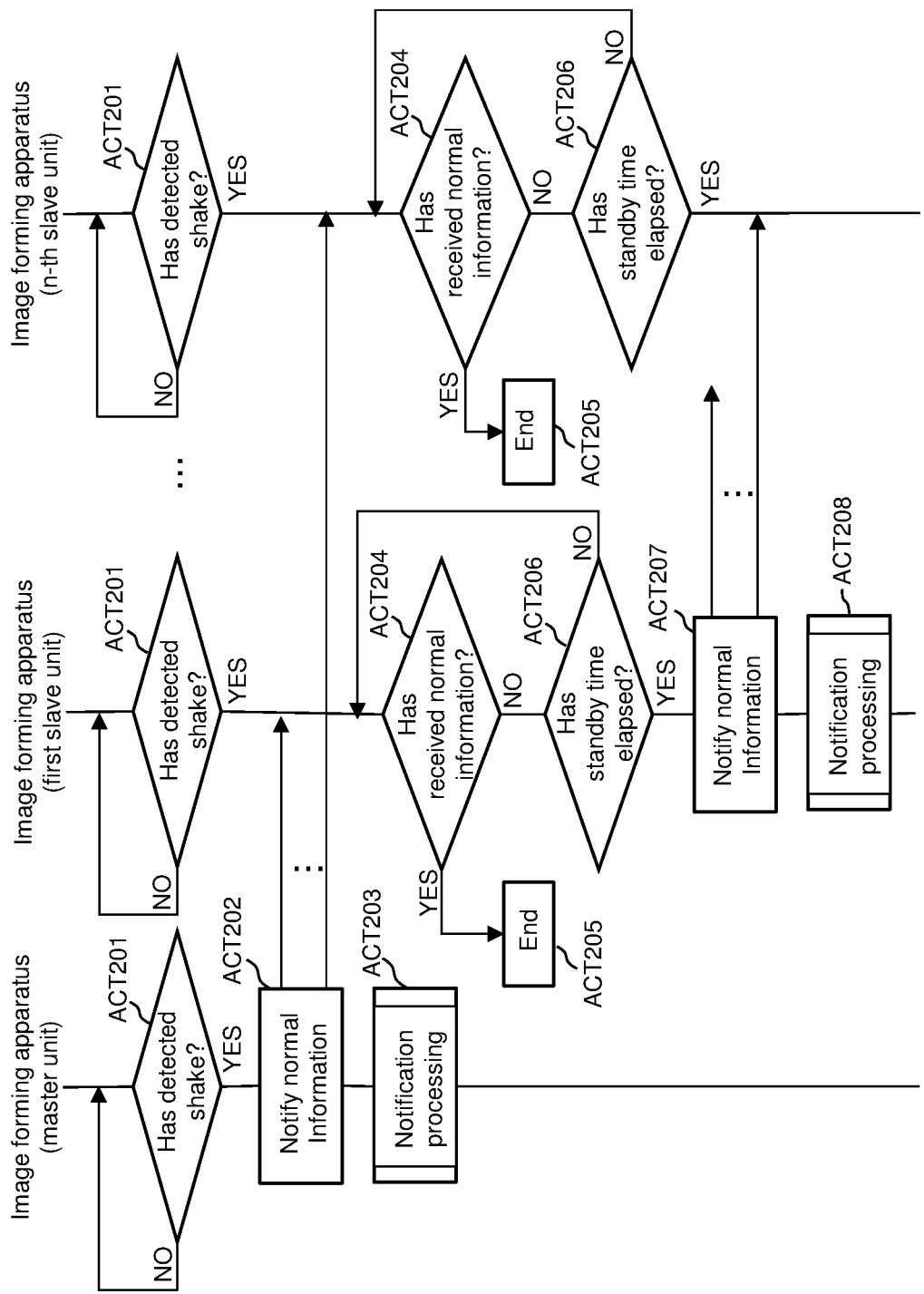
FIG. 5 is a flowchart showing a second specific example of the flow of the safety confirmation processing executed by the safety confirmation system according to the embodiment.

FIG. 5 is a diagram showing a second specific example of the flow of the safety confirmation processing executed by the safety confirmation system 600. In the example shown in FIG. 5, the safety confirmation system 600 includes the image forming apparatus 100 that operates as a master unit (hereinafter, referred to as the "image forming apparatus (master unit)") and the image forming apparatus 100 that operates as a slave unit (hereinafter, referred to as the "image forming apparatus (slave unit)". In particular, a plurality of slave units is provided. In FIG. 5, n represents an integer of 1 or more.

The processing of the image forming apparatus (master unit) 100 will be described first. In ACT201, the controller 180 of the image forming apparatus (master unit) 100 the shake sensor 170 has detected a shake of a predetermined magnitude or more. The controller 180 does not execute substantial processing of safety confirmation processing until the shake sensor 170 detects a shake of a predetermined magnitude or more (ACT201—NO). In the case where the shake sensor 170 has detected a shake of a predetermined magnitude or more (ACT201—YES), the processing of the controller 180 proceeds to ACT202. In ACT202, the controller 180 of the image forming apparatus (master unit) 100 transmits, in the case where the apparatus itself is capable of performing the subsequent notification processing, information indicating that fact (hereinafter, referred to as the "normal information") to the image forming apparatus (slave unit) 100. In ACT203, the controller 180 of the image forming apparatus (master unit) 100 performs the subsequent notification processing. Note that the notification processing represents transmission of safety confirmation information to the destination indicated by the first destination information, for example. For example, the notification processing is the processing of ACT102 and subsequent ACTs in FIG. 4.

Next, the processing of the image forming apparatus (slave unit) 100 will be described. Similarly, to the image forming apparatus (master unit) 100, also the controller 180 of the image forming apparatus (slave unit) 100 determines whether or not the shake sensor 170 has detected a shake of a predetermined magnitude or more (ACT201). In the case where the shake sensor 170 has detected a shake of a predetermined magnitude or more (ACT201—YES), the processing of the controller 180 proceeds to ACT204. In ACT204, the controller 180 of the image forming apparatus (slave unit) 100 stands by for receiving normal information from the image forming apparatus (master unit) 100. In the case where normal information has been received (ACT204—YES), the processing of the controller 180 of the image forming apparatus (slave unit) 100 proceeds to ACT205. In ACT205, the controller 180 ends the processing.

Meanwhile, in the case where normal information has not been received (ACT204—NO), the processing of the controller 180 of the image forming apparatus (slave unit) 100 proceeds to ACT206. In ACT206, the controller 180 of the image forming apparatus (slave unit) 100 determines whether or not a predetermined standby time has elapsed. In the case where the predetermined standby time has not elapsed (ACT206—NO), the processing of the controller 180 returns to ACT204. In the case where the predetermined standby time has elapsed (ACT206—YES), the processing of the controller 180 proceeds to ACT207. That is, in the processing of ACT204 and ACT206, in the case where normal information has been received before the predetermined standby time elapses (ACT204—YES), the controller 180 ends the processing. Meanwhile, in the case where normal information has not been received even after the predetermined standby time has elapsed (ACT204—NO and ACT206—YES), the controller 180 of the image forming apparatus (slave unit) 100 starts processing as a master unit by the apparatus itself. Specifically, in ACT207, the controller 180 of the image forming apparatus (slave unit) 100 transmits normal information to another image forming apparatus (slave unit) 100. After that, in ACT208, the controller 180 of the image forming apparatus (slave unit) 100 performs the subsequent notification processing.

Note that in each of the image forming apparatuses (slave units), the standby time may be set to a different length. With such a setting, there is a possibility that the slave unit operates as a master unit in order from the slave unit for which a shorter standby time has been set. For example, the slave unit for which the shorted standby time has been set (first slave unit) operates as a master unit in the case where a master unit does not transmit normal information. For example, the slave unit for which the second shortest standby time has been set (second slave unit) operates as a master unit in the case where a master unit and the first slave device do not transmit normal information.

All or part of the operation of the controller 180 may be realized by using hardware such as ASIC (Application Specific Integrated Circuit), PLD (Programmable Logic Device), and FPGA (Field Programmable Gate Array). The program may be recorded on a computer-readable recording medium. The computer-readable recording medium represents, for example, a portable medium such as a flexible disk, a magneto-optical disk, a ROM, and a CD-ROM, or a storage device such as a hard disk built in a computer system. The program may be transmitted via a telecommunication line.

In accordance with at least one embodiment described above, it is possible to more reliably execute processing responding to the occurrence of an earthquake. The details are as follows. In the safety confirmation system 600, in the case where the shake sensor 170 has detected a shake of a predetermined magnitude or more, the image forming apparatus 100 performs safety confirmation on a user by using the first destination information. Therefore, it is possible to reliably execute processing responding to the occurrence of an earthquake without particularly introducing a dedicated system for safety confirmation.

Further, in the safety confirmation system 600, after performing safety confirmation on a user by using the first destination information, safety confirmation is performed on a non-response user by using the second destination information. Therefore, it is possible to perform safety confirmation on more users by the communication using the second destination information even in the case where a failure in the communication using the first destination information or the device has occurred.

Further, in the safety confirmation system 600, in the case where an image forming apparatus that functions as a master unit, of the plurality of image forming apparatuses 100, is difficult to execute notification processing, a slave unit execute notification processing instead of the master unit. Therefore, even in the case where a failure has occurred in the master unit, it is possible to perform safety confirmation on a user by the slave unit.

<Modification>

Figure 6:
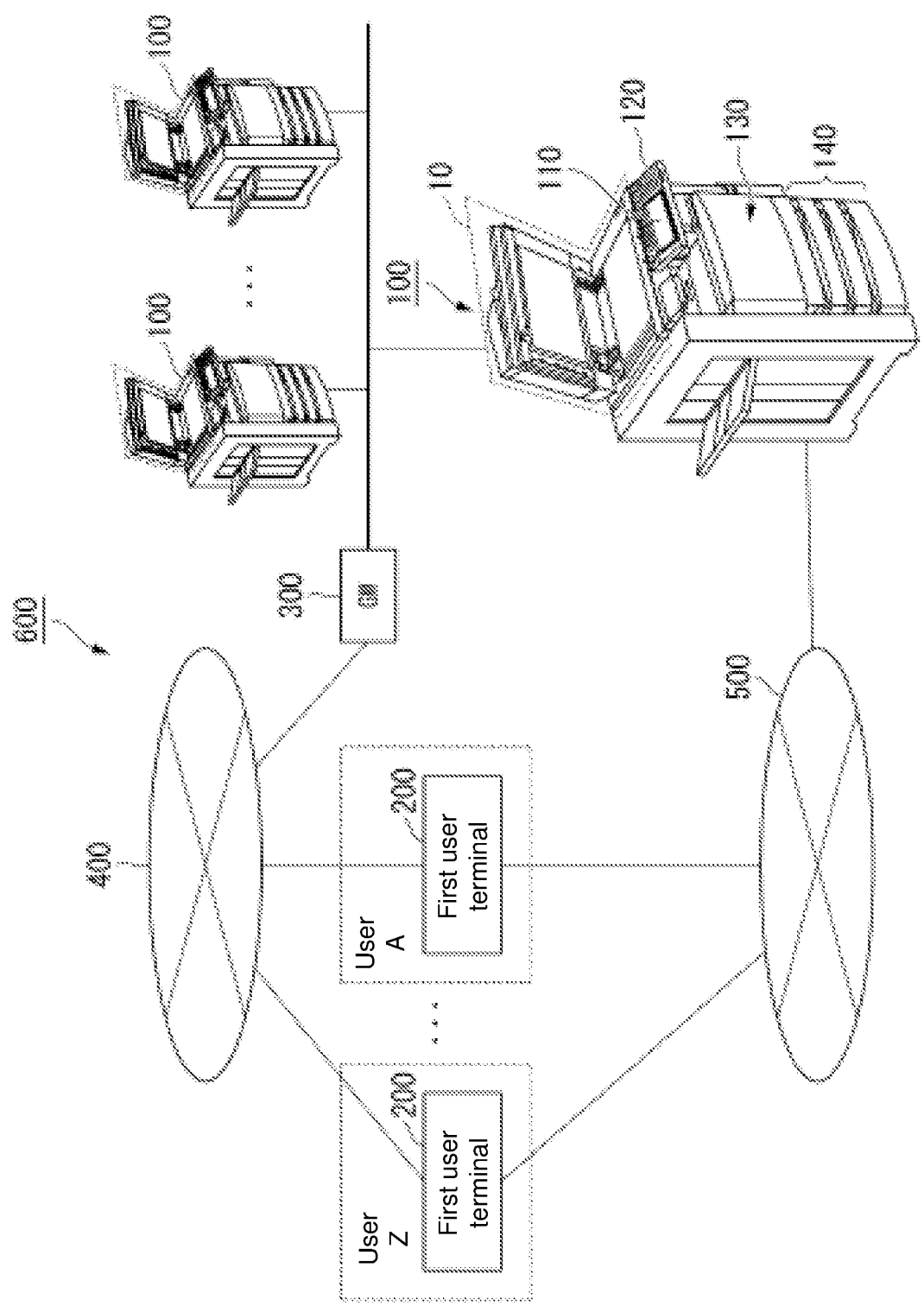
FIG. 6 is a diagram showing a first modification of the safety confirmation system according to the embodiment.

FIG. 6 shows a first modification of the safety confirmation system 600. In the first modification, each user uses one user terminal (the first user terminal 200) to receive notification corresponding to a plurality of pieces of destination information. In this case, both safety confirmation information transmitted using the first destination information and safety confirmation information transmitted using the second destination information are received and output by the first user terminal 200. However, the communication using the first destination information is performed via the first network 400, and the communication using the second destination information is performed via the second network 500. With such a configuration, since a user only needs to have one user terminal (the first user terminal 200), the burden on the user is reduced. Further, since the networks used for the first destination information and the second destination information are different from each other, even in the case where a failure has occurred in one of these networks, it is possible to perform safety confirmation with the other network.

For example, a packet network such as the Internet may be used as the first network 400, and a circuit-switched network may be used as the second network 500. The first destination information may be, for example, destination information used in a specific application installed in the first user terminal 200, or may be an e-mail address. The second destination information may be, for example, a telephone number assigned to the first user terminal 200. In this case, a user may be notified, by SMS, of the information transmitted to the second destination information.

Figure 7:
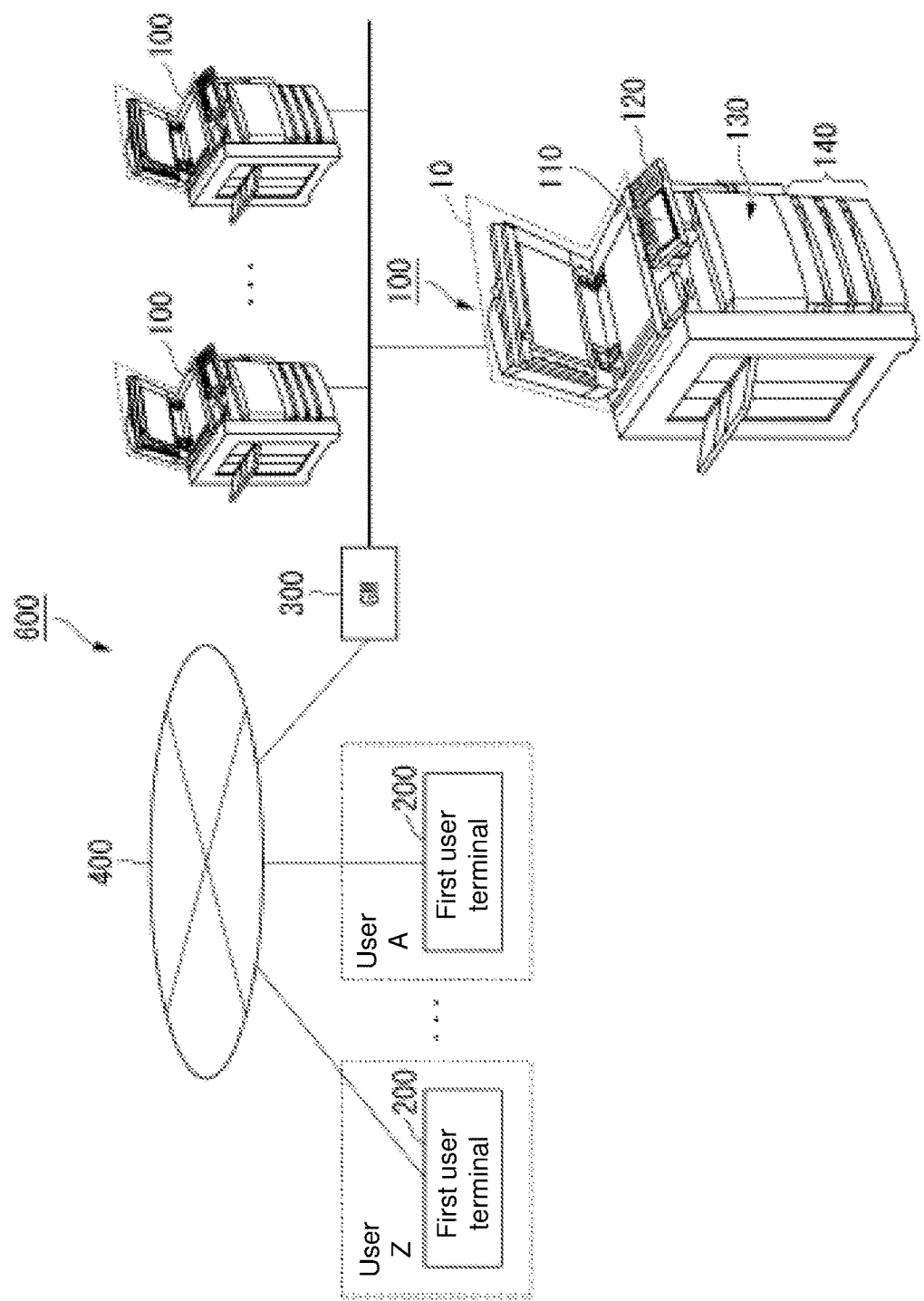
FIG. 7 is a diagram showing a second modification of the safety confirmation system according to the embodiment.

FIG. 7 shows a second modification of the safety confirmation system 600. In the second modification, each user use one user terminal (the first user terminal 200) to receive notification corresponding to a plurality of pieces of destination information. In this case, both safety confirmation information transmitted using the first destination information and safety confirmation information transmitted using the second destination information are received and output by the first user terminal 200. Further, both the communication using the first destination information and the communication using the second destination information are performed via the first network 400. With such a configuration, since a user only needs to have one user terminal (the first user terminal 200), the burden on the user is reduced. Further, since it is unnecessary to connect the image forming apparatus 100 to a plurality of networks (the first network 400 and the second network 500), it is possible to reduce the cost and labor necessary for constructing the safety confirmation system 600.

For example, a packet network such as the Internet may be used as the first network 400. The first destination information may be, for example, destination information used in a specific application installed in the first user terminal 200. The second destination information may be an e-mail address.

For example, a circuit-switched network may be used as the first network 400. The first destination information may be, for example, a telephone number assigned to the first user terminal 200. In this case, a user may be notified, by SMS, of the information transmitted to the destination indicated by the first destination information. The second destination information may be, for example, a FAX number assigned to the first user terminal 200. In this case, the information transmitted to the destination indicated by the second destination information may be received as a FAX signal and output by the first user terminal 200.

In the above description, the image forming apparatus 100 has made a notification to only a non-response user by using the second destination information. However, the image forming apparatus 100 may make a notification using the second destination information to a plurality of users including a non-response user. For example, in the case where a non-response user is present, the image forming apparatus 100 may transmit safety confirmation information to destinations indicated by the pieces of second destination information of all users. With such a configuration, it is possible to receive safety responses from all users with a higher probability. Meanwhile, in the case of making a notification using the second destination information to only a non-response user as described above, the user who has made a safety response does not receive the notification using the second destination information. Therefore, it is possible to prevent the user who has made a safety response from being forced to take the trouble twice, such as causing confusion.

The image forming apparatus 100 of the safety confirmation system 600 may form, in the case of outputting non-response-user information, a character or image indicating a list of non-response users on a sheet and output the information. In the case where the safety confirmation system 600 includes a plurality of image forming apparatuses 100 and outputs non-response-user information, a specific image forming apparatus 100 may output non-response-user information. For example, the image forming apparatus 100 operating as a master unit may output the non-response-user information described above, or a specific different image forming apparatus 100 may output the non-response-user information. As a specific example of the specific different image forming apparatus 100, the image forming apparatus 100 installed closest to the department that manages the safety confirmation (e.g., the personnel department or the general affairs department) may output the non-response-user information.

The image forming apparatus 100 of the safety confirmation system 600 may start the processing shown in FIG. 4 or FIG. 5 in response to a user operation instead of starting the processing in response to the detection of a shake by the shake sensor 170. For example, the processing of ACT102 or the processing of ACT202 may be performed in response to the operation of a predetermined button in the control panel 120 by a user. Further, the processing of ACT102 or the processing of ACT202 may be performed in response to an instruction from a client terminal such as a mobile terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a communication device that communicates with a terminal apparatus used by each of a plurality of users via a network, the terminal apparatus including a first terminal apparatus and a second terminal apparatus used by the same user;
   a storage device that stores, for each of pieces of user identification information for identifying the plurality of users, destination information including first destination information indicating a destination used for transmitting information to the first terminal apparatus and second destination information indicating a destination used for transmitting information to the second terminal apparatus;
   a shake sensor that detects a shake; and
   a controller configured to
      transmit, where the shake sensor has detected a shake of a predetermined magnitude or more, response request information that is information for requesting a response to the destination indicated by the first destination information stored in the storage device via the communication device;
      transmit, where a predetermined condition is satisfied after the response request information is transmitted to the destination indicated by the first destination information, the response request information to the destination indicated by the second destination information,
   wherein the predetermined condition is a condition indicating that a sufficient time has elapsed for a user to operate the first terminal apparatus to make a safety response.

2. The image forming apparatus according to claim 1, wherein
   the controller determines, after transmitting the response request information to the destination indicated by the first destination information, whether or not a user from whom the response has not been received is present on a basis of information regarding the response stored in the storage device.

3. An image forming apparatus, comprising:
   a communication device that communicates with a terminal apparatus used by each of a plurality of users via a network, the terminal apparatus including a first terminal apparatus and a second terminal apparatus used by the same user;
   a storage device that stores, for each of pieces of user identification information for identifying the plurality of users, destination information including first destination information indicating a destination used for transmitting information to the first terminal apparatus and second destination information indicating a destination used for transmitting information to the second terminal apparatus;
   a shake sensor that detects a shake; and
   a controller configured to
      transmit, where the shake sensor has detected a shake of a predetermined magnitude or more, response request information that is information for requesting a response to the destination indicated by the first destination information stored in the storage device via the communication device;
      transmit, where a user from whom the response has not been received is present after transmitting the response request information to the destination indicated by the first destination information, the response request information to the destination indicated by the second destination information stored for each of the pieces of user identification information for identifying the plurality of users in the storage device;
      receive, where a response has been transmitted from the destination, the transmitted response, and
      record, in the storage device, information regarding the received response.

4. The image forming apparatus according to claim 3, wherein
   the controller
      transmits the response request information to the destination indicated by the first destination information first, and
      transmits, where a non-response user who is a user from whom the response has not been received is present after transmitting the response request information, the response request information to the destination indicated by the second destination information stored for each of the pieces of user identification information for identifying the plurality of users including the non-response user in the storage device.

5. An image forming apparatus, comprising:
   a communication device that communicates with a terminal apparatus used by each of a plurality of users via a network;
   a storage device that stores, for each of pieces of user identification information for identifying the plurality of users, destination information indicating a destination used for transmitting information to the terminal apparatus;
   a shake sensor that detects a shake; and
   a controller configured to
      transmit, where the shake sensor has detected a shake of a predetermined magnitude or more, response request information that is information for requesting a response to a destination indicated by the destination information stored in the storage device via the communication device,
      receive, where a response has been transmitted from the destination, the transmitted response, and
      record, in the storage device, information regarding the received response, wherein
   the image forming apparatus
      is connected to a different image forming apparatus including the communication device, the storage device, the shake sensor, and the controller via a network, and
      is set to be operable as a master unit or a slave unit with respect to the different image forming apparatus, and
   where the image forming apparatus is set to be operable as the master unit,
      the different image forming apparatus operates as a slave unit, and
      the controller of the master unit transmits, where the shake sensor has detected a shake of a predetermined magnitude or more, normal information indicating that the image forming apparatus is operable to the slave device that is the different image forming apparatus before transmitting the response request information.

6. The image forming apparatus according to claim 5, wherein
where the image forming apparatus is set to be operable as a slave unit,
the different image forming apparatus operates as a master unit, and
the controller of the slave device receives, where the shake sensor has detected a shake of predetermined magnitude or more, the normal information from the master unit.

7. The image forming apparatus according to claim 6, wherein
where the image forming apparatus is set to be operable as a slave unit,
the different image forming apparatus operates as a master unit, and
the controller of the slave unit starts, where the shake sensor has detected a shake of a predetermined magnitude or more and the normal information has not been received even after a predetermined time has elapsed, an operation as the master unit.

\* \* \* \* \*